US009984493B2

(12) United States Patent
Zhou et al.

(10) Patent No.: US 9,984,493 B2
(45) Date of Patent: May 29, 2018

(54) METHOD AND SYSTEM FOR VOLUME RENDERING BASED ON 3D IMAGE FILTERING AND REAL-TIME CINEMATIC RENDERING

(71) Applicant: SIEMENS HEALTHCARE GMBH, Erlangen (DE)

(72) Inventors: Shaohua Kevin Zhou, Plainsboro, NJ (US); Klaus Engel, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 224 days.

(21) Appl. No.: 14/977,467

(22) Filed: Dec. 21, 2015

(65) Prior Publication Data
US 2016/0269723 A1 Sep. 15, 2016

Related U.S. Application Data

(63) Continuation-in-part of application No. 14/641,471, filed on Mar. 9, 2015, now Pat. No. 9,613,452.

(51) Int. Cl.
G06T 15/08 (2011.01)
G06T 15/06 (2011.01)
G06T 5/00 (2006.01)

(52) U.S. Cl.
CPC .............. *G06T 15/06* (2013.01); *G06T 5/002* (2013.01); *G06T 15/08* (2013.01);
(Continued)

(58) Field of Classification Search
None
See application file for complete search history.

(56) References Cited

U.S. PATENT DOCUMENTS 7,154,500 B2   12/2006   Heng et al.
7,184,041 B2   2/2007    Heng et al.
(Continued)

FOREIGN PATENT DOCUMENTS

JP   H11339062 A   12/1999
JP   2004121845 A   4/2004

OTHER PUBLICATIONS

Kroes, Thomas, et al., "Exposure Render: An Interactive Photo-Realistic Volume Rendering Framework," Plos One, Jul. 2, 2012, 11 pages, vol. 7, retrieved from http://http://journals.plos.org/plosone/article?id=10.1371/journal.pone.0038586.
(Continued)

*Primary Examiner* — Said Broome

(57) ABSTRACT

A method and apparatus for volume rendering based 3D image filtering and real-time cinematic volume rendering is disclosed. A set of 2D projection images of the 3D volume is generated using cinematic volume rendering. A reconstructed 3D volume is generated from the set of 2D projection images using an inverse linear volumetric ray tracing operator. The reconstructed 3D volume inherits noise suppression and structure enhancement from the projection images generated using cinematic rendering, and is thus non-linearly filtered. Real-time volume rendering can be performed on the reconstructed 3D volume using volumetric ray tracing, and each projected image of the reconstructed 3D volume is an approximation of a cinematic rendered image of the original volume.

17 Claims, 3 Drawing Sheets

(52) U.S. Cl.
CPC ............... *G06T 2207/10028* (2013.01); *G06T 2207/10072* (2013.01); *G06T 2207/10136* (2013.01); *G06T 2207/30004* (2013.01); *G06T 2210/41* (2013.01)

(56) References Cited

U.S. PATENT DOCUMENTS

| | | |
|---|---|---|
| 7,330,578 B2 | 2/2008 | Wang et al. |
| 2006/0291710 A1 | 12/2006 | Wang et al. |
| 2008/0069422 A1 | 3/2008 | Wang et al. |
| 2011/0122997 A1* | 5/2011 | Lu .................. A61N 5/1031 378/65 |
| 2012/0154400 A1 | 6/2012 | Steen |
| 2012/0299914 A1 | 11/2012 | Kilpatrick |
| 2013/0028492 A1* | 1/2013 | Dorn .................. G06T 1/60 382/128 |
| 2014/0309518 A1 | 10/2014 | Sung |
| 2014/0369464 A1* | 12/2014 | Lee .................. A61B 6/503 378/41 |

OTHER PUBLICATIONS

Levoy, "Efficient Ray Tracing of Volume Data", ACM Transactions on Graphics, vol. 9, No. 3, Jul. 1990, pp. 245-261.

Nagae, Takanori et al., "Cell Projection Volume Rendering", Imaging Science & Engineering Laboratory, Faculty of Engineering, Tokyo Institute of Technology, vol. 53, No. 7, pp. 1033-1039, 1999.

* cited by examiner 102 104

METHOD AND SYSTEM FOR VOLUME RENDERING BASED ON 3D IMAGE FILTERING AND REAL-TIME CINEMATIC RENDERING

This application is a continuation-in-part of U.S. patent application Ser. No. 14/641,471, filed Mar. 9, 2015, the disclosure of which is herein incorporated by reference in its entirety.

BACKGROUND OF THE INVENTION

The present invention relates to image filtering to reduce noise in an image, and more particularly, to 3D image filtering based on volume rendering to suppress noise and enhance structure of interest in a 3D image.

Image noise is inherent to any imaging device. Image noise in a volumetric image presents undesirable artifacts. Existing noise reduction and image enhancement methods do not totally solve this problem. Accordingly, better noise reduction and image enhancement algorithms are desirable.

Conventional noise reduction methods are mostly based on signal processing theories. A smoothing filter convolves the original image with a mask that represents a low-pass filter or smoothing operation. However, smoothing filters tend to blur the image. The anisotropic diffusion method solves a smoothing partial differential equation similar to a heat equation to remove noise without blurring the edges of the image. A median filter is an example of a non-linear filter and, if properly designed, is very good at preserving image detail. However, median filters work better for salt-and-pepper image noise.

BRIEF SUMMARY OF THE INVENTION

The present invention provides a method and system for volume rendering based 3D image filtering and real-time cinematic volume rendering. Embodiments of the present invention perform 3D image filtering path tracing based volume rendering to generate realistic, cinematic rendering effects.

In one embodiment of the present invention, a set of 2D projection images of the 3D volume corresponding to a plurality of projection angles is generated using Monte Carlo path tracing based cinematic volume rendering. A reconstructed 3D volume is generated from the set of 2D projection images using an inverse linear volumetric ray tracing operator.

In another embodiment, a 3D volume is received at a cloud computing system from a client device. A set of 2D projection images of the 3D volume is generated in the cloud computing system using cinematic volume rendering. A reconstructed 3D volume is generated in the cloud computing system from the set of 2D projection images using an inverse linear volumetric ray tracing operator.

These and other advantages of the invention will be apparent to those of ordinary skill in the art by reference to the following detailed description and the accompanying drawings.

DETAILED DESCRIPTION

Figure 1:
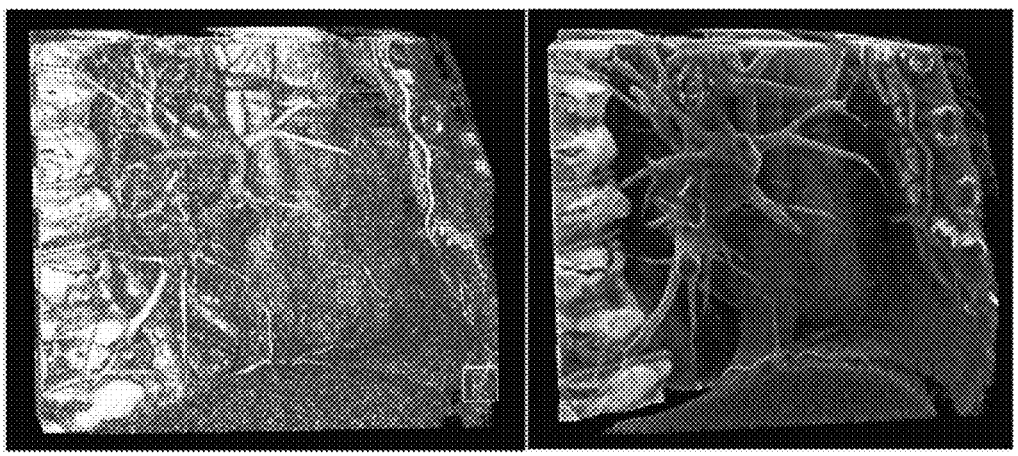
FIG. 1 shows a comparison a projected images generated using ray tracing volume rendering and cinematic volume rendering.

The present invention relates to a method and system for volume rendering based 3D image filtering and real-time cinematic volume rendering. Embodiments of the present invention are described herein to give a visual understanding of the image filtering and real-time cinematic volume rendering method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Volume rendering refers to techniques used to display a 2D projected image of a 3D volume. One type of volume rendering is based on volumetric ray tracing. Ray tracing volume rendering is performed by generating a ray for each pixel in the 2D projected image using a simple camera model. The ray is sampled at regular or adaptive intervals in throughout the 3D image volume. The volume data is interpolated at each sample point, a transfer function is applied at each sample point to form an RGBA (Red, Green, Blue, Alpha) sample, the sample is composited onto the accumulated RGBA of the ray, and the process is repeated for each sample point until the ray exits the volume. The accumulated RGBA of the ray is converted to an RGB color, which is deposited in the corresponding pixel of the 2D projected image. The 2D projected image is formed by repeating this process for every pixel of the 2D projected image. Volumetric ray tracing can be described by a linear projection operator $\Pi$ that operates on a 3D volume V, using a camera model with a parameter $\theta$, to generate a 2D image I, such that:

$$I = \Pi(V; \theta). \tag{1}$$

By varying the parameter $\theta$, different projection images $I(\theta)$ can be generated. The parameter $\theta$ denotes the projection angle for a projection image.

Since the projection operator $\Pi$ is linear, it is easy to invert the operator $\Pi^{-1}$. Given a set of rendered images $\{I(\theta_i); i=1, 2, \ldots\}$, the original volume V can be reconstructed using the inverted operator $\Pi^{-1}$. This inverse process is in principle similar to volumetric image reconstruction, and can be expressed as:

$$V = \Pi^{-1}(\{\theta_i; i=1,2, \ldots\}). \tag{2}$$

Cinematic volume rendering is based on volumetric path tracing. Rather than integrating observations from a 3D volume on a ray, cinematic volume rendering is performed by integrating over all of the illuminance arriving at a single point on the surface of the object. This illuminance is then reduced by a surface reflectance function to determine how much of the illuminance will go towards the viewpoint camera. This integration procedure is repeated for every pixel in the output 2D projected image. Cinematic volume rendering can be described as volumetric path tracing using a non-linear projection operator $\Omega$ (also referred to herein as the cinematic rendering operator) that operates on a 3D volume V, using a camera model with a parameter θ, to generate a 2D image J, such that:

$$J = \Omega(V; \theta). \tag{3}$$

In the rendered image J generated using cinematic volume rendering, noise is largely suppressed and the structures are greatly enhanced.

The cinematic rendering operator Ω calculates estimates of the incoming light to virtual detector pixels inside a virtual camera for an image plane corresponding to the projection angle θ. Many of such estimates are averaged to create each projection image. As more estimates are computed and averaged, the quality of the projection image improves and the projection image becomes less noisy. To calculate the estimates of the incoming light, for each detector pixel, a light path or ray is traced through the 3D volume V, the ray is sampled at various positions in the 3D volume, and the opacity values at the sampling positions are integrated over the path of the ray. The color at each sampling position, which can be determined by applying a transfer function to the interpolated volume density) is combined (e.g., multiplied) with the ray color to model the interaction of the light with the volume. The ray color can be initialized as white. A scattering event is determined at a position in the 3D volume using Woodcock tracking, which is a well-known technique. A random new direction of the ray can be determined using a phase function (i.e., a probability density function (PDF) for the scatter direction) of the material at the scattering position (e.g., based on interpolated intensity data for the 3D volume). The scattered ray is again traced using Woodcock tracking to determine the next scattering position, and this process is repeated until the light is absorbed or the light exits the volume domain. The absorption can be modeled sing a maximum threshold for the number of scatter events or probabilistically using an extinction PDF based on the number of scatter events. If the ray is still inside the volume domain after all scattering events, there is no light contribution of this ray to the detector pixel. If the ray exits the volume domain, the light contribution for the current ray direction from the irradiance light probe data is sampled and multiplied with the ray color. The resulting ray color is added to the detector pixel color.

In an advantageous embodiment, the cinematic rendering operator Ω uses Monte-Carlo path tracing to sample random light paths through the 3D volume and can thus capture complex lighting effects and sophisticated camera models. Due to the stochastic nature of the Monte-Carlo path tracing algorithm, many complex light paths inside the volume are considered and form a smooth, photo-realistic image over time. In a possible implementation, the Monte-Carlo path tracing algorithm begins with stochastic raycasting, which yields a high dynamic range Monte Carlo estimate of light arriving at the image plane of the virtual camera. Stochastic raycasting implements a thin lens camera model, which incorporates a finite aperture and models a real-world camera. Camera rays are constructed by sampling a point on the lens and sampling a perturbed point within the finite area of a pixel on the image plane of the virtual camera with stratified sampling. The rays are intersected with the 3D volume's bounding box, yielding a parametric range of rays. Rays that do not intersect with the 3D volume are discarded. Woodcock tracking is used to determine where scattering events occur within the 3D volume for each ray. The Monte-Carlo path tracing algorithm may then filter each estimate of light arriving at the image plane, for example using a separable Gaussian kernel, in order to reduce anti-aliasing. The Monte-Carlo path tracing algorithm then performs Monte-Carlo integration by computing the cumulative moving average of sampling positions over the N light transport paths, resulting in an estimate of the incident light on the image plane of the virtual camera. In an exemplary implementation, the estimate of incident light on the image plane of the virtual camera for a particular viewing/projection angle can be calculated by averaging all light contributions to each pixel $I_i$ on the image plane of the virtual camera from sampling positions on N light transport paths as $$I_i = \frac{1}{N} \sum_{j=1}^{N} \frac{f_i(C_j)}{p(X_j)},$$

where i refers to the pixel on the image plane of the virtual camera, j refers to the light transport path, $f_i(C_j)$ is the light being transported along the particular path for lighting $C_j$ coming from a light source at the end of the path, and $p(X_j)$ is the probability for the path $X_j$. This Monte-Carlo integration procedure produces a smooth image for a large N. An anisotropic noise filter can then be applied to the final estimate at every iteration. A plurality of estimates can be averaged for each camera position θ (i.e., projection angle) to get a set of projection images. In an exemplary implementation, the cinematic rendering operator Ω can be implemented using Monte-Carlo path tracing by performing the above operations that result in set of projection images for a plurality of projection angles. This Monte-Carlo path tracing algorithm is very efficient, since Woodcock tracking is performed along only a single path through the volume for each detector pixel for each estimate.

To capture surface shading of implicit surfaces inside the 3D volume, the above described approach for cinematic volume rendering can be extended by computing the gradient magnitude from the volume data at each scattering position and modeling a probabilistic surface scatter event based on the gradient magnitude. If such a surface scattering event happens, a random ray direction in the hemisphere of the surface normal is created. The probability for a reflective scatter event is determined from the bidirectional reflectance distribution function (BRDF) of the volume data at the scatter position, which can be derived from the interpolated volume data. If such a reflective scatter events occurs, the random hemisphere direction is focused along the reflected ray direction. The resulting hemisphere ray direction is used to continue the tracing of the lights path through the volume. When the ray leaves the volume domain and only reflective scatter events occurred along the ray's path, the light contribution to the detector pixel is determined by looking up the contribution from a reflective light probe. Otherwise, the light contribution is sampled from the irradiance light probe. In both cases the contribution is combined with the ray color and added to the detector pixel. Ray that did not hit the volume domain or did not scatter inside the volume can either have no color contribution to the detector pixel or add the light contribution from the unfiltered light probe.

In one possible embodiment, the contribution from the irradiance light probe and the reflective light probe can additionally be computed at each surface scattering position inside the volume. Instead of just multiplying the color at the sampling position to the ray color as previously described, the color is weighted with the contribution from the irradiance light probe along a random hemisphere direction and the contribution along the reflected direction from the reflective light probe is added. The resulting color is combined with the ray color and used as the ray color for additional scatter events.

In another possible embodiment, area light sources can be used instead of light probe for shading computations. In this embodiment the scattering positions are determined as before, but the scatter directions are limited to directions towards random positions on a random area light source. This embodiment does not only check for a free path towards the light source but allows the light to scatter along all possible paths towards the light sources. However, since we do not allow arbitrary scattering directions, we cannot capture all lights paths through the volume, causing unlit parts of the volume to become completely black. To circumvent this effect we also allow uniformly distributed random scattering directions with a probability smaller than a user selected ambient lighting threshold to add ambient occlusion lighting to those parts of the volume. As describes above, surface scattering events are performed with a probability derived from the gradient magnitude at the scatter position. For each surface scattering event, the volume color at the scattering position is modified by the diffuse and reflective contributions of a BRDF evaluation and combined with the ray color to form the new ray color. The ray color is only added to the detector pixel if the ray leaves the volume domain before light is being absorbed.

All detector pixels form an image buffer containing an averaged contribution from all estimates. This buffer mat be continuously presented to the user and refined over time by computing additional estimates in the background and adding their contributions to detector image buffer. In the case of high dynamic range lighting (HDR), tone mapping is performed before the image is presented to the user. When rendering parameters, such as the camera position are changed, the image buffer is cleared and the computation of estimates is started again.

The cinematic rendering algorithm can be parallelized, since the individual ray paths as well as the image estimates can be computed independently. Due to the larger number of paths that are computed to get a smooth image, the algorithm may be run on a fast processing platform, such as for example, a many-core accelerator in a workstation, a single GPU (graphics processing unit) inside a workstation, multiple GPUs inside a workstation, a local GPU cluster, or a remote rendering service in the form of a cloud service running many GPUs or many-core accelerators.

FIG. 1 shows a comparison a projected images generated using ray tracing volume rendering and cinematic volume rendering. As shown in FIG. 1, image 102 is a projected image generated using ray tracing volume rendering and image 104 is a projected image generated using cinematic volume rendering. As can be seen in FIG. 1, noise is greatly reduced and anatomical structures are enhanced in the projected image 104 generated using cinematic rendering, as compared to the projected image 102 generated using ray tracing volume rendering.

In terms of computation, cinematic volume rendering is more time-consuming than ray tracing volume rendering. Ray tracing volume rendering can be performed in real-time, for example during a surgical procedure guiding by medical images of a patient, while cinematic volume rendering typically cannot be performed in real-time due to its high computational cost.

Figure 2:
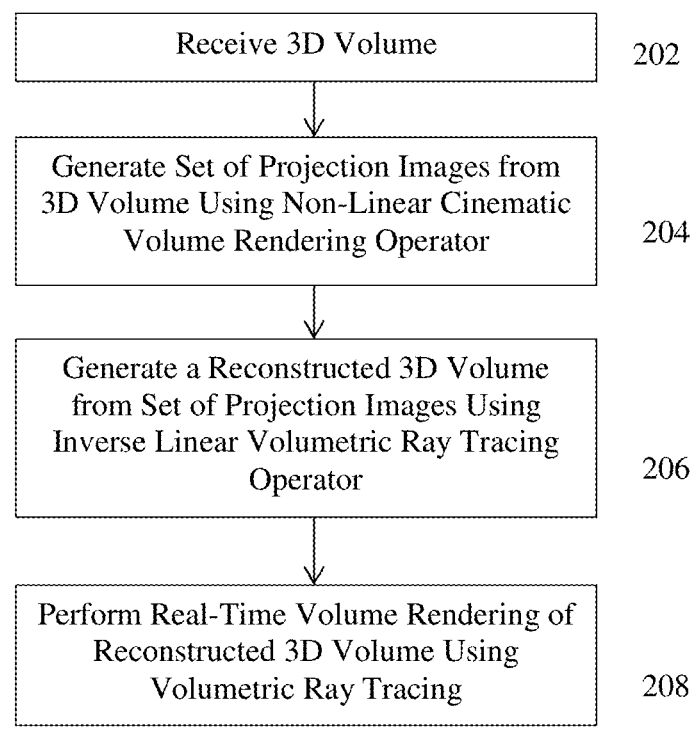
FIG. 2 illustrates a method for volume rendering based 3D image filtering and real-time cinematic volume rendering according to an embodiment of the present invention.

FIG. 2 illustrates a method for volume rendering based 3D image filtering and real-time cinematic volume rendering according to an embodiment of the present invention. The method of FIG. 2 transforms 3D image data, such as medical image data representing a patient's anatomy to suppress noise and enhance structures of interest in the image data and to generate 2D projected images having suppressed noise and enhance image structures from the 3D image data. Referring to FIG. 2, at step 202, a 3D volume is received. The 3D volume can be a 3D medical image volume of a patient acquired using any type of medical imaging modality, such as computed tomography (CT), magnetic resonance imaging (MRI), dynaCT, ultrasound (US), positron emission tomography (PET), etc. The 3D volume can be received directly from an image acquisition device, such as a CT scanner, MRI scanner, etc., or the 3D volume can be received by a 3D volume previously stored in a memory or storage of a computer system.

At step 204, a set of projection images is generated from the 3D volume using a non-linear cinematic rendering operator $\Omega$. In particular, a set of projection images $\{J(\theta_i)=\Omega(V; \theta_i); i=1, 2, \ldots\}$ is generated with different values for projection angle parameter $\theta_i$. This results in a set of 2D projection images generated using cinematic rendering, in which noise is suppressed and structures of interest are enhanced. The 2D projection images for different projection angles may be generated using the cinematic rendering techniques described above. In addition, in an advantageous embodiment, one or more tuning parameters of the cinematic rendering operator $\Omega$ can be adjusted to customize the cinematic rendering and the resulting projection images for a particular clinical application. The parameters can be set based on prior knowledge of the clinical application to further reduce noise commonly associated with the 3D image data for the clinical application. The parameters can also be set to emphasize certain structures in the projection images. For example, the parameters of the cinematic rendering operator can be tuned to emphasize or highlight bone structures and reduce noise associated with non-bone (e.g., vessel) structures in medical image data or to emphasize or highlight vessel structures and reduce noise associated with non-vessel (e.g., bone) structures in medical image data. In an exemplary implementation, boundaries of bone or vessel structures can be acquired via a segmentation algorithm, and the gradient magnitude of the bone or vessel boundaries can be artificially boosted for the cinematic rendering in order to better highlight the bone or vessel structures in the rendered images.

At step 206, a reconstructed volume is generated from the set of projection images using an inverse linear volumetric ray tracing operator $\Pi^{-1}$. That is a new volume $V'=\Pi^{-1}(\{J(\theta_i); i=1, 2, \ldots\})$ is estimated by applying the inverse linear volumetric ray tracing operator $\Pi^{-1}$ to the set of projection images $\{J(\theta_i)=\Omega(V; \theta_i; i=1, 2, \ldots\}$ generated using the non-linear cinematic rendering operator $\Omega$, such that:

$$V'=\Pi^{-1}(\{\Omega(V;\theta_i));i=1,2,\ldots\}). \quad (4)$$

In Equation (4), a given volume V is input and a new volume V' is output. Accordingly, steps 204 and 206 can be considered to perform non-linear filtering on the input volume. Because noise is largely suppressed and the structures are greatly enhanced in the rendered cinematic images, the non-linearly filtered volume V' reconstructed from the rendered cinematic images inherits the same characteristics (i.e., suppressed noise and enhanced structures of interest). The filtered volume V' can be output, for example, for example by displaying the filtered volume V' on a display of a computer system.

At step 208, real-time volume rendering of the reconstructed volume is performed using volumetric ray tracing of the reconstructed volume. In particular, the linear volumetric ray tracing operator $\Pi$ is used to perform volume rendering of the reconstructed volume to generate a 2D projected image I, such that:

$$I=\Pi(V;\theta)=\Pi\Pi^{-1}(\{\Omega(V;\theta_i);i=1,2,\ldots\})\approx\Omega(V;\theta)=J. \quad (5)$$

By applying volumetric ray tracing volume rendering to the filtered volume V', the rendered image I will be very close to the cinematic rendered image J from the original volume. In an advantageous embodiment, steps 202, 204, and 206 can be performed prior to a surgical procedure to pre-compute the filtered volume V', and step 208 can be performed in real-time during a surgical procedure for one or more projection angles $\theta$. By pre-computing the filtered volume V', the real-time rendering performed using ray tracing volume rendering can generate 2D a projected image I that is very close to a cinematic rendered image of the original volume for the same projection angle. In this way, the computational bottleneck of cinematic rendering causing non-real-time performance can be eliminated and 2D projection images having cinematic rendering effects of noise suppression and structure enhancement can be generated in real-time.

A 2D projection image resulting from the real-time volume rendering in step 208 can be output, for example, by displaying the 2D projection image on a display of a computer system. The projection image can be displayed in real-time during a surgical procedure to guide a user performing the surgical procedure. Step 208 of FIG. 2 can be repeated to perform real-time volume rendering of the filtered volume V' at a plurality of different projection angles $\theta$. In this case, the 2D projection image generated for each projection angle can be displayed in real-time.

Figure 3:
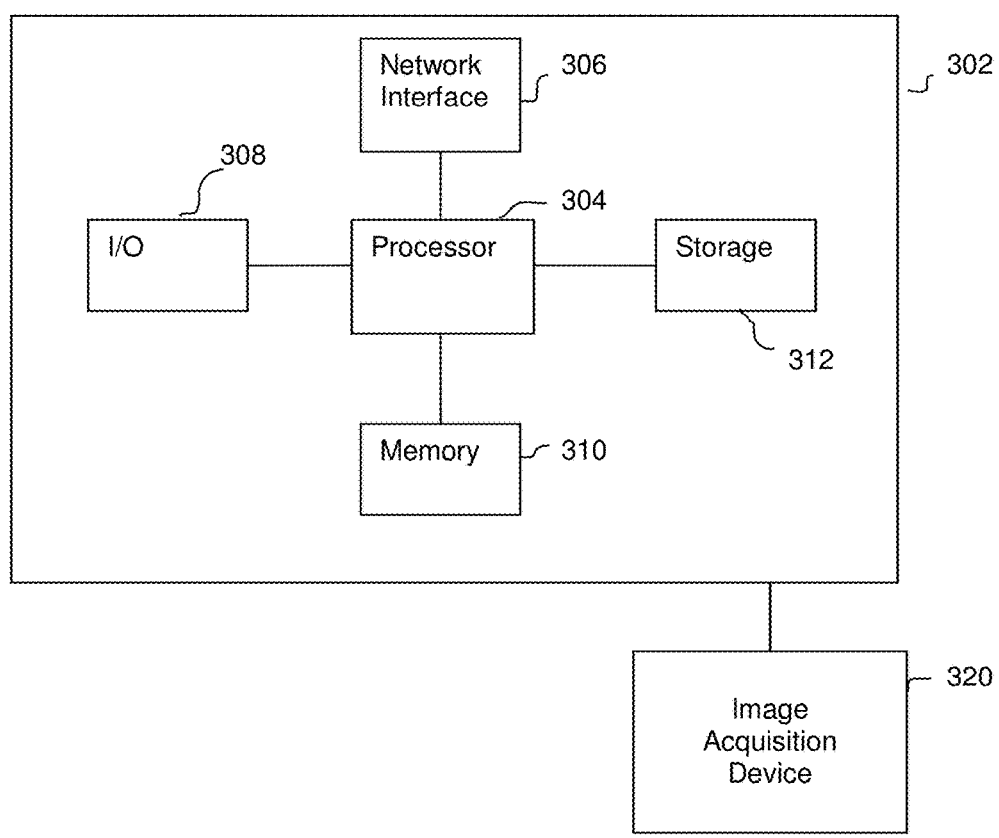
FIG. 3 is a high-level block diagram of a computer capable of implementing the present invention.

The above-described methods for volume rendering based 3D image filtering and real-time cinematic volume rendering may be implemented on a computer using well-known computer processors, memory units, storage devices, computer software, and other components. A high-level block diagram of such a computer is illustrated in FIG. 3. Computer 302 contains a processor 304, which controls the overall operation of the computer 302 by executing computer program instructions which define such operation. The computer program instructions may be stored in a storage device 312 (e.g., magnetic disk) and loaded into memory 310 when execution of the computer program instructions is desired. Thus, the steps of the methods of FIG. 2 may be defined by the computer program instructions stored in the memory 310 and/or storage 312 and controlled by the processor 304 executing the computer program instructions. An image acquisition device 320, such as a CT scanning device, can be connected to the computer 302 to input image data to the computer 302. It is possible to implement the image acquisition device 320 and the computer 302 as one device. It is also possible that the image acquisition device 320 and the computer 302 communicate wirelessly through a network. The computer 302 also includes one or more network interfaces 306 for communicating with other devices via a network. The computer 302 also includes other input/output devices 308 that enable user interaction with the computer 302 (e.g., display, keyboard, mouse, speakers, buttons, etc.). Such input/output devices 308 may be used in conjunction with a set of computer programs as an annotation tool to annotate volumes received from the image acquisition device 320. One skilled in the art will recognize that an implementation of an actual computer could contain other components as well, and that FIG. 3 is a high level representation of some of the components of such a computer for illustrative purposes.

The above-described methods for volume rendering based 3D image filtering and real-time cinematic volume rendering may be implemented in network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. Certain steps of the method of FIG. 2, may be performed by a server or by another processor in a network-based cloud-computing system. Certain steps of the method of FIG. 2, may be performed locally by a client computer in a network-based cloud computing system. In one embodiment, the method for volume rendering based 3D image filtering and real-time cinematic volume rendering can be implemented using a network-based cloud computing system as follows. A client computer can receive the input 3D volume (step 202 of FIG. 2). The client computer can then send the 3D volume to a server in the network-based cloud computing system. The server or other computer devices in the cloud computing system can then generate the projection images using the non-linear cinematic volume rendering operator (step 204), generate the reconstructed 3D volume from projection images using the inverse linear volumetric ray tracing operator (step 206), and perform the volume rendering using the reconstructed 3D volume (step 208). The cloud computing system can then send the reduced noise 2D projection images resulting from the volume rendering back to the client computer, which can display the resulting 2D projection images. For example, the client device can send a request for a 2D projection image corresponding to a particular projection angle to the cloud computing system, and, in response to receiving the request, the cloud computing system can generate the 2D projection image by performing volumetric ray tracing of the reconstructed 3D volume and transmit the 2D projection image to the client device. In another embodiment, the method for volume rendering based 3D image filtering and real-time cinematic volume rendering can be implemented using a network-based cloud computing system as follows. The client computer can receive the input 3D volume (step 202). The client computer can then send the 3D volume to a server in the network-based cloud computing system. The server or other computer devices in the cloud computing system can then generate the projection images using the non-linear cinematic volume rendering operator (step 204), generate the reconstructed 3D volume from projection images using the inverse linear volumetric ray tracing operator (step 206), and send the generated reconstructed 3D volume back to the client computer. The client computer can then locally perform the volume rendering using the reconstructed 3D volume (step 208) and display the reduced noise 2D projection images resulting from the volume rendering.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for volume rendering based filtering of a 3D volume, comprising:
   receiving, at a cloud computing system, a 3D volume from a client device;
   generating, in the cloud computing system, a set of 2D projection images of the 3D volume using cinematic volume rendering, wherein generating the set of 2D projection images of the 3D volume using cinematic volume rendering comprises:
      generating the set of 2D projection images of the 3D volume using a non-linear cinematic volume rendering operator; and
   generating, in the cloud computing system, a reconstructed 3D volume from the set of 2D projection images using an inverse linear volumetric ray tracing operator, wherein generating the reconstructed 3D volume from the set of 2D projection images using the inverse linear volumetric ray tracing operator comprises:
      generating the reconstructed 3D volume by applying the inverse linear volumetric ray tracing operator to the set of 2D projection images of the 3D volume generated using the non-linear cinematic volume rendering operator.

2. The method of claim 1, further comprising:
   generating, in the cloud computing system, a projected 2D image from the reconstructed 3D volume by performing volumetric ray tracing of the reconstructed 3D volume; and
   transmitting the projected 2D image from the cloud computing system to the client device.

3. The method of claim 2, wherein generating, in the cloud computing system, a projected 2D image from the reconstructed 3D volume by performing volumetric ray tracing of the reconstructed 3D volume comprises:
   generating the projected 2D image from the reconstructed 3D volume by performing volumetric ray tracing of the reconstructed 3D volume in response to receiving a request for a projected 2D image with corresponding projection angle from the client device.

4. The method of claim 1, further comprising:
   transmitting the reconstructed 3D volume from the cloud computing system to the client device.

5. The method of claim 1, wherein generating, in the cloud computing system, a set of 2D projection images of the 3D volume using cinematic volume rendering comprises:
   generating a respective 2D projection image of the 3D volume for each of a plurality of projection angles using Monte Carlo path tracing based cinematic volume rendering.

6. The method of claim 5, wherein generating a respective 2D projection image of the 3D volume for each of a plurality of projection angles using Monte Carlo path tracing based cinematic volume rendering comprises, for each of the plurality of projection angles:
   generating a plurality of estimates of the respective 2D projection image for the projection angle by performing Monte Carlo path tracing for each estimate to calculate a pixel value for each of a plurality of pixels an image plane corresponding to the respective 2D projection image by integrating illuminance over sampling positions on a plurality of light paths arriving at a corresponding point on a surface of the 3D volume; and
   calculating an average of the plurality of estimates of the respective 2D projection image for the projection angle.

7. The method of claim 6, wherein generating a plurality of estimates of the respective 2D projection image for the projection angle by performing Monte Carlo path tracing for each estimate to calculate a pixel value for each of a plurality of pixels an image plane corresponding to the respective 2D projection image by integrating illuminance over sampling positions on a plurality of light paths arriving at a corresponding point on a surface of the 3D volume comprises:
   determining scattering positions in each of the plurality of light paths using Woodcock tracking.

8. The method of claim 6, wherein generating a respective 2D projection image of the 3D volume for each of a plurality of projection angles using Monte Carlo path tracing based cinematic volume rendering comprises, for each of the plurality of projecting angles:
   applying a noise reduction filter to each of the plurality of estimates of the respective 3D projection image for the projection angle.

9. The method of claim 1, wherein parameters of the non-linear cinematic volume rendering operator are tuned based on specific anatomy present in the 3D volume to reduce noise associated with the specific anatomy or emphasize the specific anatomy in the set of 2D projection images of the 3D volume.

10. A method for volume rendering based filtering of a 3D volume, comprising:
    generating a set of 2D projection images of the 3D volume corresponding to a plurality of projection angles using Monte Carlo path tracing based cinematic volume rendering; and
    generating a reconstructed 3D volume from the set of 2D projection images using an inverse linear volumetric ray tracing operator,
    wherein generating a set of 2D projection images of the 3D volume corresponding to a plurality of projection angles using Monte Carlo path tracing based cinematic volume rendering comprises, for each of the plurality of projection angles:
       generating a plurality of estimates of the 2D projection image corresponding to the projection angle by performing Monte Carlo path tracing for each estimate to calculate a pixel value for each of a plurality of pixels an image plane corresponding to the 2D projection image by integrating illuminance over sampling positions on a plurality of light paths arriving at a corresponding point on a surface of the 3D volume, and
       calculating an average of the plurality of estimates of the 2D projection image corresponding to the projection angle.

11. The method of claim 10, wherein generating a plurality of estimates of the 2D projection image corresponding to the projection angle by performing Monte Carlo path tracing for each estimate to calculate a pixel value for each of a plurality of pixels an image plane corresponding to the 2D projection image by integrating illuminance over sampling positions on a plurality of light paths arriving at a corresponding point on a surface of the 3D volume comprises:

determining scattering positions in each of the plurality of light paths using Woodcock tracking.

12. The method of claim 10, wherein generating a set of 2D projection images of the 3D volume corresponding to a plurality of projection angles using Monte Carlo path tracing base cinematic volume rendering further comprises, for each of the plurality of projecting angles:
applying a noise reduction filter to each of the plurality of estimates of the 3D projection image corresponding to the projection angle.

13. The method of claim 10, further comprising:
generating a projected 2D image from the reconstructed 3D volume by performing volumetric ray tracing of the reconstructed 3D volume.

14. An apparatus for volume rendering based filtering of a 3D volume, comprising:
a processor; and
a memory storing computer program instructions, which when executed by the processor cause the processor to perform operations comprising:
generating a set of 2D projection images of the 3D volume corresponding to a plurality of projection angles using Monte Carlo path tracing based cinematic volume rendering; and
generating a reconstructed 3D volume from the set of 2D projection images using an inverse linear volumetric ray tracing operator,
wherein generating a set of 2D projection images of the 3D volume corresponding to a plurality of projection angles using Monte Carlo path tracing based cinematic volume rendering comprises, for each of the plurality of projection angles:
generating a plurality of estimates of the 2D projection image corresponding to the projection angle by performing Monte Carlo path tracing for each estimate to calculate a pixel value for each of a plurality of pixels an image plane corresponding to the 2D projection image by integrating illuminance over sampling positions on a plurality of light paths arriving at a corresponding point on a surface of the 3D volume, and
calculating an average of the plurality of estimates of the 2D projection image corresponding to the projection angle.

15. The apparatus of claim 14, wherein generating a plurality of estimates of the 2D projection image corresponding to the projection angle by performing Monte Carlo path tracing for each estimate to calculate a pixel value for each of a plurality of pixels an image plane corresponding to the 2D projection image by integrating illuminance over sampling positions on a plurality of light paths arriving at a corresponding point on a surface of the 3D volume comprises:
determining scattering positions in each of the plurality of light paths using Woodcock tracking.

16. The apparatus of claim 14, wherein generating a set of 2D projection images of the 3D volume corresponding to a plurality of projection angles using Monte Carlo path tracing base cinematic volume rendering further comprises, for each of the plurality of projecting angles:
applying a noise reduction filter to each of the plurality of estimates of the 3D projection image corresponding to the projection angle.

17. The apparatus of claim 11, further comprising:
generating a projected 2D image from the reconstructed 3D volume by performing volumetric ray tracing of the reconstructed 3D volume.

* * * * *